(12) United States Patent
Choudhary et al.

(10) Patent No.: US 7,269,610 B2
(45) Date of Patent: Sep. 11, 2007

(54) SYSTEM AND METHOD TO OBSERVE USER BEHAVIOR AND PERFORM ACTIONS INTROSPECTABLE OBJECTS

(75) Inventors: Samar Choudhary, Morrisville, NC (US); Naveenkumar V. Muguda, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/845,962

(22) Filed: May 14, 2004

(65) Prior Publication Data

US 2005/0257103 A1    Nov. 17, 2005

(51) Int. Cl.
G06F 17/30    (2006.01)
(52) U.S. Cl. ..................... 707/202; 707/100
(58) Field of Classification Search .......... 707/102, 707/200, 2, 8, 100, 103 R–103 Z, 202, 203, 707/101
See application file for complete search history.

(56) References Cited

U.S. PATENT DOCUMENTS

| | | | |
|---|---|---|---|
| 6,023,271 A | 2/2000 | Quaeler-Bock et al. ..... 345/335 |
| 6,061,721 A | 5/2000 | Ismael et al. ............... 709/223 |
| 6,275,790 B1 | 8/2001 | Yamamoto et al. ............ 704/8 |
| 2002/0095524 A1 | 7/2002 | Sanghvi et al. ............. 709/318 |
| 2002/0165996 A1 | 11/2002 | Hrebejk et al. ............. 709/316 |
| 2003/0018832 A1 | 1/2003 | Amirisetty et al. ......... 709/328 |
| 2003/0088576 A1 | 5/2003 | Hattori et al. .......... 707/103 R |
| 2003/0093575 A1* | 5/2003 | Upton ....................... 709/310 |
| 2003/0135657 A1 | 7/2003 | Barker et al. ............... 709/310 |
| 2003/0159130 A1 | 8/2003 | Broussard et al. .......... 717/120 |
| 2003/0163439 A1 | 8/2003 | Hankin et al. ................. 707/1 |
| 2003/0172088 A1 | 9/2003 | Mandal et al. ............. 707/200 |
| 2003/0188039 A1 | 10/2003 | Liu et al. ................... 709/315 |
| 2004/0225689 A1* | 11/2004 | Dettinger et al. ........... 707/200 |

* cited by examiner

*Primary Examiner*—John Cottingham
*Assistant Examiner*—Cheryl Lewis
(74) *Attorney, Agent, or Firm*—Van Leeuwen & Van Leeuwen; Andre Gibbs

(57) ABSTRACT

A system and method to observe user behavior and perform actions on interospectable objects is presented. A console logs backend events it receives from plug-ins and user actions it receives from a user. The console mines the logged entries and creates initial rules in response to mining the log entries. The console proceeds through a series of steps using the initial rules' cause nodes and effect nodes to generate deduced rules. The deduced rules include global user actions and global backend events. When the console receives subsequent backend events, the console matches the backend events with one of the global backend events included one of the deduced rules, and performs a corresponding global user action.

17 Claims, 7 Drawing Sheets

```
300

<perspective>
    <node>
                                            310
        <class>Class_D</class>
        <constraint>null</constraint>     320
        <node>
                                            330
            <role-name>rDB</role-name>    340
            <constraint>null</constraint>

<node>
                                              350
                <role-name>rBC</role-name>  360
                <constraint>null</constraint>
            </node>
            <node>
                                              370
                <role-name>rBA</role-name>  380
                <constraint>null</constraint>
            </node>
        </node>
    </node>
</perspective>
```

*Figure 3*

SYSTEM AND METHOD TO OBSERVE USER BEHAVIOR AND PERFORM ACTIONS INTROSPECTABLE OBJECTS

BACKGROUND OF THE INVENTION

1. Technical Field

The present invention relates in general to a system and method to observe user behavior and perform actions on introspectable objects. More particularly, the present invention relates to a system and method for generating deduced rules using logged backend events and corresponding user actions.

2. Description of the Related Art

Enterprise administration becomes more and more complex as the enterprise being administered increases in size. An enterprise may include a multitude of components such as machines, drivers, applications, services, and processes. Each of these components may be designed to interface with a particular management system or console, which results in an overwhelming administration task. In an effort to alleviate some of the complexity of managing an enterprise, the Distributed Management Task Force (DMTF) introduced the Common Information Model (CIM) to standardize the representation of these components. The CIM model allows a user to describe a component in a manner that is not bound to a particular implementation or platform.

With the multitude of components that an enterprise may include, a user may wish to analyze the enterprise using particular views. For example, a user may wish to view the enterprise in a topology tree structure which first sorts the machines, based upon clusters, and then into subnets. Once the user's console renders a requested view, the user monitors the view for backend events, such as "server down." When the user notices a backend event, the user issues a user action, such as "restart server." A challenge found, however, when a rendered view supports a plurality of heterogeneous backends, is the difficulty in generalizing the enterprise's behavior across a multitude of related components (e.g. machines), which may be in different subnets and clusters.

Furthermore, a user typically performs the same user action when the user receives the same backend event. For example, the user may perform a "restart server" each time the user notices a "server down" backend event. A challenge found, however, is automating user actions in response to receiving events that are generated at heterogeneous, and possibly numerous, backends that correspond to a navigation tree's imposed hierarchy in which the hierarchy may be hardcoded or softwired through the use of a descriptive model. Softwires abstract physically unrelated and unconnected objects into logical node trees, peer nodes, and peer trees, such that common events, rules, and actions are defined. In turn, multi-component command requests are processed based upon a particular rendered view.

What is needed, therefore, is a system and method to automatically perform actions in response to receiving backend events from heterogeneous backend environments.

SUMMARY

It has been discovered that the aforementioned challenges are resolved by generating deduced rules based upon logged backend events and user actions, and using the deduced rules to generate user actions in response to receiving subsequent backend events. A console logs backend events that it receives from plug-ins, as well as user actions it receives from a user. The console proceeds through a series of steps to generate deduced rules from the logged backend events and user actions. In turn, the console uses the deduced rules to automatically generate user actions when it receives backend events that correspond to one of the deduced rules.

A console receives a view request from a user. The view request includes a request for the console to display nodes in a particular manner, such as a particular tree structure. For example, the user may wish to view objects included in his computer system in a manner corresponding to a structure of objects of class A at the topmost level, objects of class B at the next level, and objects of class C at the lower most level. The console retrieves a perspective along with a managed definition object (MDO), and generates a view using the perspective and MDO. The perspective describes how nodes in a particular view are rendered. In addition, the perspective may include softwires between particular nodes. The MDO includes a class hierarchy, which includes class relations such as associations and instance information corresponding to various classes.

Objects that correspond to the user's rendered view reside on a backend. For example, a first backend may be an application server that executes application programs. In this example, the application server and the application program have corresponding nodes that are shown in the rendered view. The backend sends an event to the console through a respective "plug-in."

In addition, each backend event has a corresponding "cause node." A cause node is a node in a view whose corresponding object is a place at which the backend event actually occurs. For example, a backend event "server down" may occur on server "XYZ" and the node in a view that corresponds to server XYZ is the cause node. When a console receives a backend event, the console displays and logs the backend event, along with its corresponding cause node.

When a user notices an event on his display, the user responds with a user action using the console. The console recognizes the user action, which corresponds to one of the events, and logs the user action as such. For example, an event may be "database down" and a corresponding user action may be "restart database." Each user action has a corresponding "effect node." An effect node is a node in a view whose corresponding object is a place at which the user action occurs. For example, a user action "restart application" may be targeted towards application "CDE" and the node in a view that corresponds to application CDE is the effect node.

The console mines the log entries and creates "initial rules" using well-known data mining algorithms. The console then groups the initial rules by backend event type and user action type. For example, the console may create initial rule "grouping types" such as "E1→A1", "E2→A4", and "E1→A2" that represents an event "E" causing an action "A." In this example, E1 and E2 are backend event types, and A1, A2, and A4 are user action types.

Once the initial rules are grouped, the console selects one of the groups, and subgroups the initial rules in the selected group based upon the initial rules' corresponding cause nodes, such as "a11", "a21", etc. Once the console subgroups the initial rules by cause node, the console generates "preliminary rules" for each subgroup by analyzing the initial rules' effect nodes. The console generates preliminary rules for each subgroup, and then generates deduced rules by analyzing the preliminary rules and their corresponding cause nodes. The console stores the deduced rules and accesses the deduced rules for future reference when the console receives events that correspond to the deduced rules.

Each deduced rule includes a "global backend event" and a "global user action" in which the console uses when it receives subsequent backend requests. For example, if a deduced rule is "for every server down, restart application," the console performs a "restart application" action whenever the console receives subsequent "server down" events from any of the administered server nodes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3 is an example of a perspective that is defined using a class model;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
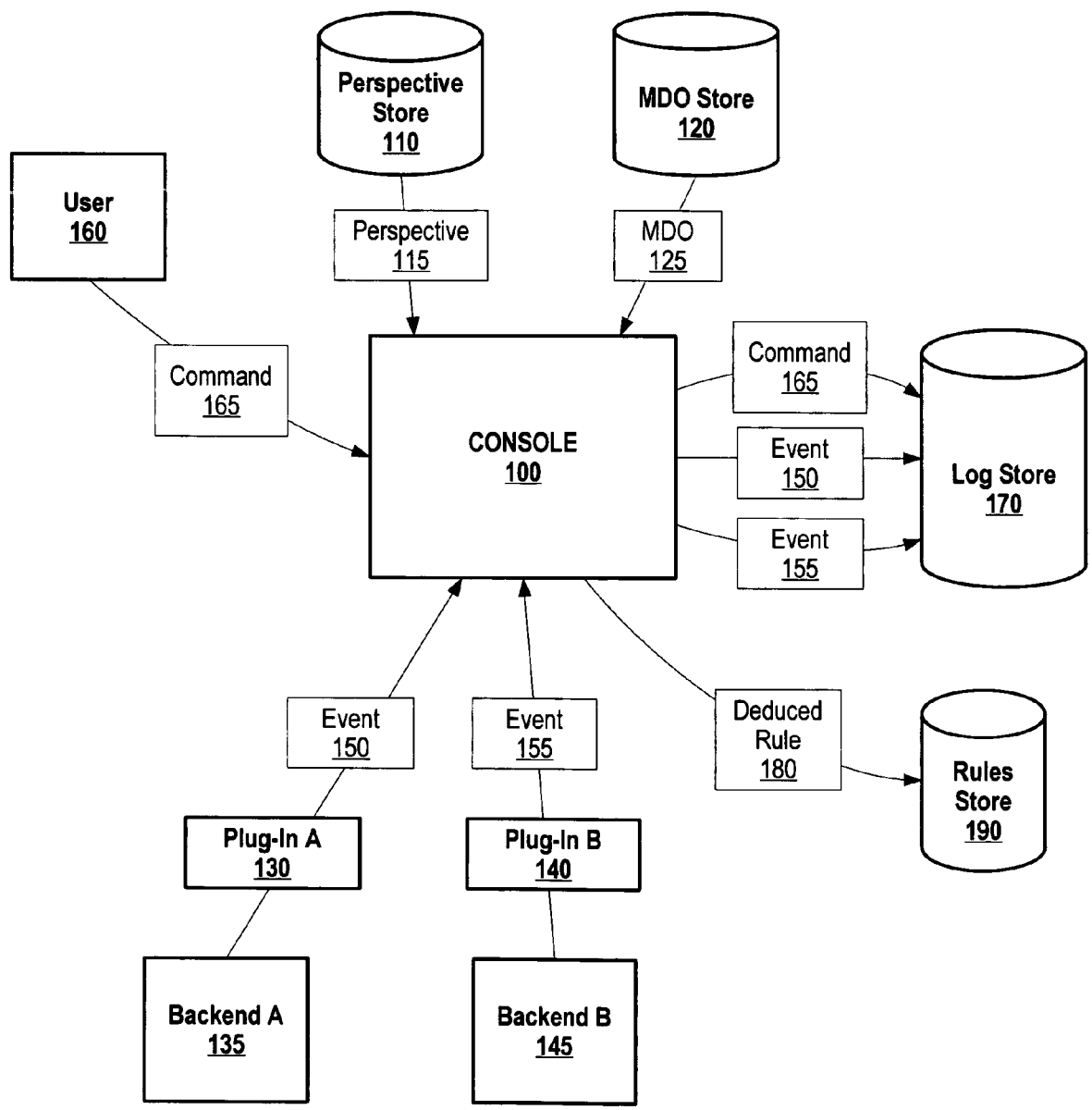
FIG. 1 is a diagram of a console that generates rules by using logged backend events and user actions.

FIG. 1 is a diagram of a console that generates rules by using logged backend events and user actions. The rules are based upon a particular view that includes nodes, whereby the nodes correspond to objects that reside on a plurality of heterogeneous backends.

Console 100 receives view request 105 from user 160. View request 105 requests console 100 to display nodes in a particular manner, such as a particular tree structure. For example, user 160 may wish to view objects included in his computer system in a manner corresponding to a structure of objects of class A at the topmost level, objects of class B at the next level, and objects of class C at the lower most level. Console 100 retrieves perspective 115 from perspective store 110, management definition object (MDO) 125 from MDO store 120, and generates the view using perspective 115 and MDO 125. Perspective 115 describes how nodes in a particular view are rendered and includes softwires between particular nodes (see FIG. 3 and corresponding text for further details regarding perspective details). MDO 125 includes a class hierarchy, which includes class relations such as associations and instance information corresponding to various classes. Perspective store 110 and MDO store 120 may be stored on a nonvolatile storage area, such as a computer hard drive.

Objects that correspond to user 160's rendered view reside on backend A 135 and backend B 145. For example, backend A 135 may be an application server that executes application programs. In this example, the application server and the application program have corresponding nodes in the rendered view. Backend A 135 and backend B 145 communicate with console 100 through plug-in A 130 and plug-in B 140, respectively. When a backend event occurs on backend A 135, plug-in A 130 sends a backend event, such as event 150, to console 100. Likewise, when an event occurs on backend B 145, plug-in B 140 sends the backend event, such as event 155, to console 100.

Each backend event has a corresponding "cause node." A cause node is a node in a view whose corresponding object is the place at which the backend event occurs. For example, a backend event "server down" may occur on server "XYZ" and the node in a view that corresponds to server XYZ is the cause node. Console 100 displays events 150 and 155, and logs the events in log store 170 for future log entry analysis and rule generation.

When user 160 notices event 150 or event 155, user 160 responds with a user action (e.g. command 165) to console 100. Console 100 recognizes that command 165 is a user action that corresponds to one of the events, and logs command 165 as such. For example, event 150 may be "database down" and command 165 may be "restart database." Each user action has a corresponding "effect node." An effect node is a node in a view whose corresponding object is the place at which the user action occurs. For example, a user action "restart application" may be targeted towards application "CDE" and the node in a view that corresponds to application CDE is the effect node.

Console 100 mines the log entries in log store 170, and groups "initial rules" by backend event type and user action type. For example, console 100 may create initial rule "grouping types" such as "E1→A1", "E2→A4", and "E1→A2." In this example, E1 and E2 are backend event types, and A1, A2, and A4 are user action types.

Console selects a grouping type, and subgroups the initial rules in the selected grouping type based upon the initial rules' corresponding cause nodes, such as "a11", "a21", etc. Once console 100 subgroups the initial rules by cause node, console 100 generates "preliminary rules" for each subgroup by analyzing the initial rules' effect nodes. Console 100 generates preliminary rules for each subgroup, and then generates deduced rules by analyzing the preliminary rules and their corresponding cause nodes (see FIGS. 5, 6A, 6B, and corresponding text for further details regarding rule generation). Console 100 stores the deduced rules, such as deduced rule 180, in rules store 190 for future reference when console 100 receives events similar to event 150 and event 155. Deduced rule 180 includes a "global backend event" and a "global user action" in which console 100 uses when it receives subsequent backend requests. For example, if the deduced rule is "for every server down, restart application," then when console 100 receives subsequent "server down" events, console 100 performs a "restart application" action from any application being administered from the console.

Figure 2:
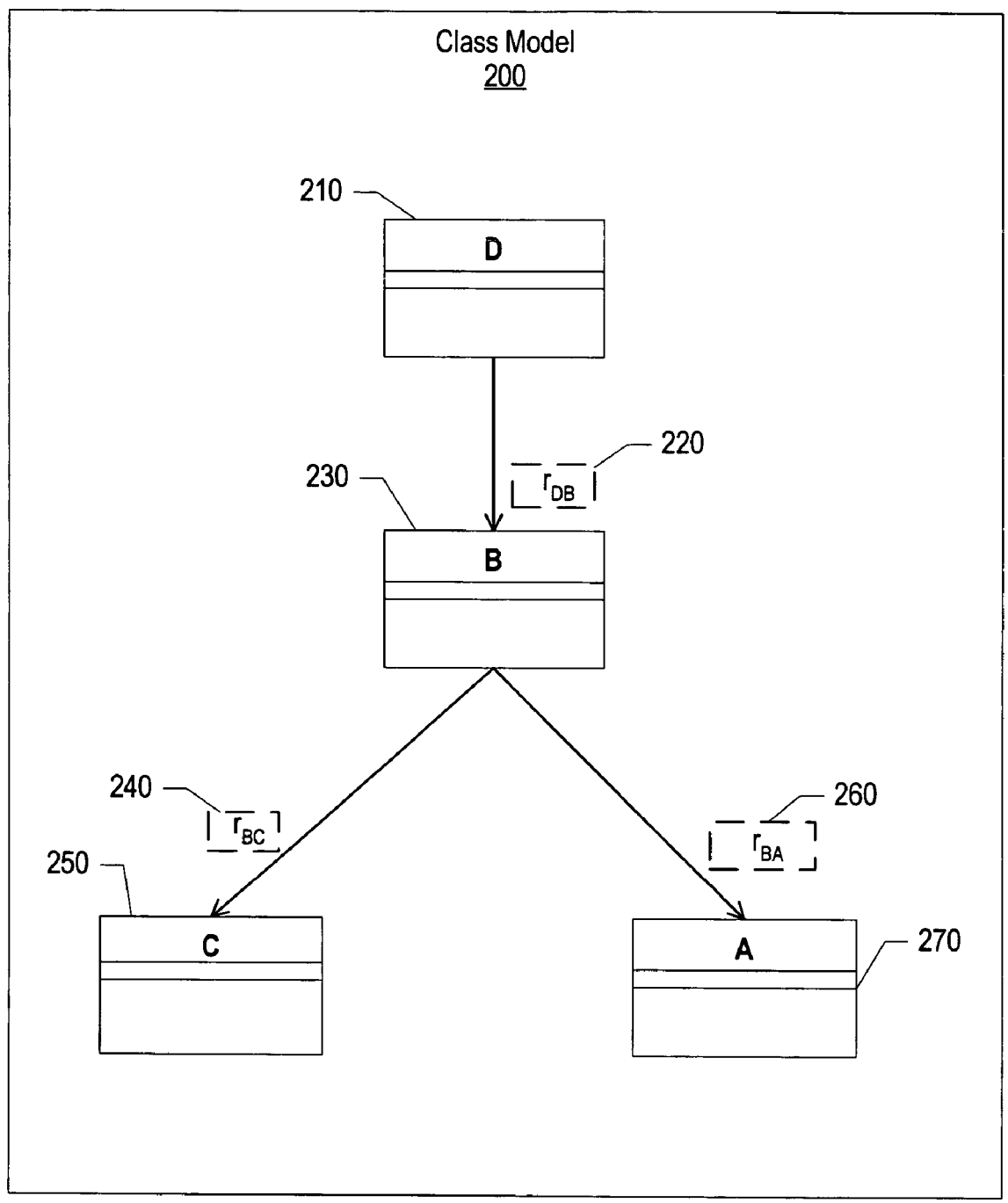
FIG. 2 is a diagram showing a class model.

FIG. 2 is a diagram showing a class model. Class model 200 includes classes 210, 230, 250, and 270. Role names of classes that correspond to their association with other classes are displayed in boxes 220, 240, and 260. The associations are included in rules that are generated from the result of backend events and user actions (see FIG. 5 and corresponding text for further details regarding rule generation).

Box 220 shows that the role name of class B (class 230) in its association with class D (class 210) is "$r_{DB}$." Box 240 shows that the role name of class C (class 250) in its association with class B (class 230) is "$r_{BC}$." Box 260 shows that the role name of class A (class 270) in its association with class B (class 230) is "$r_{BA}$."

FIG. 3 is an example of a perspective that is defined using a class model. The example shown in FIG. 3 is presented in an XML language. As one skilled in the art can appreciate, other languages may be used to define a perspective.

Perspective 300 includes lines 310 through 380 that are related to a particular class hierarchy, such as that shown in FIG. 2. Line 310 identifies a class "Class_D" which is at the root level of perspective 300 and corresponds to class 210 that is shown in FIG. 2. Line 320 shows that no constraints are specified for "Class_D." Line 330 identifies a role name "$r_{DB}$" which corresponds to the role name of class 230 in its association with class 210, both of which are shown in FIG. 2. Line 340 shows that no constraints are placed upon the role name "$r_{DB}$."

Line 350 identifies a role name "$r_{BC}$" which corresponds to the role name of class 250 in its association with class 230, both of which are shown in FIG. 2. Line 360 shows that no constraints are placed upon the role name "$r_{BC}$." Line 370 identifies a role name "$r_{BA}$" which corresponds to the role name of class 270 in its association with class 230, both of which are shown in FIG. 2. Line 380 shows that no constraints are placed upon the role name "$r_{BA}$."

Figure 4:
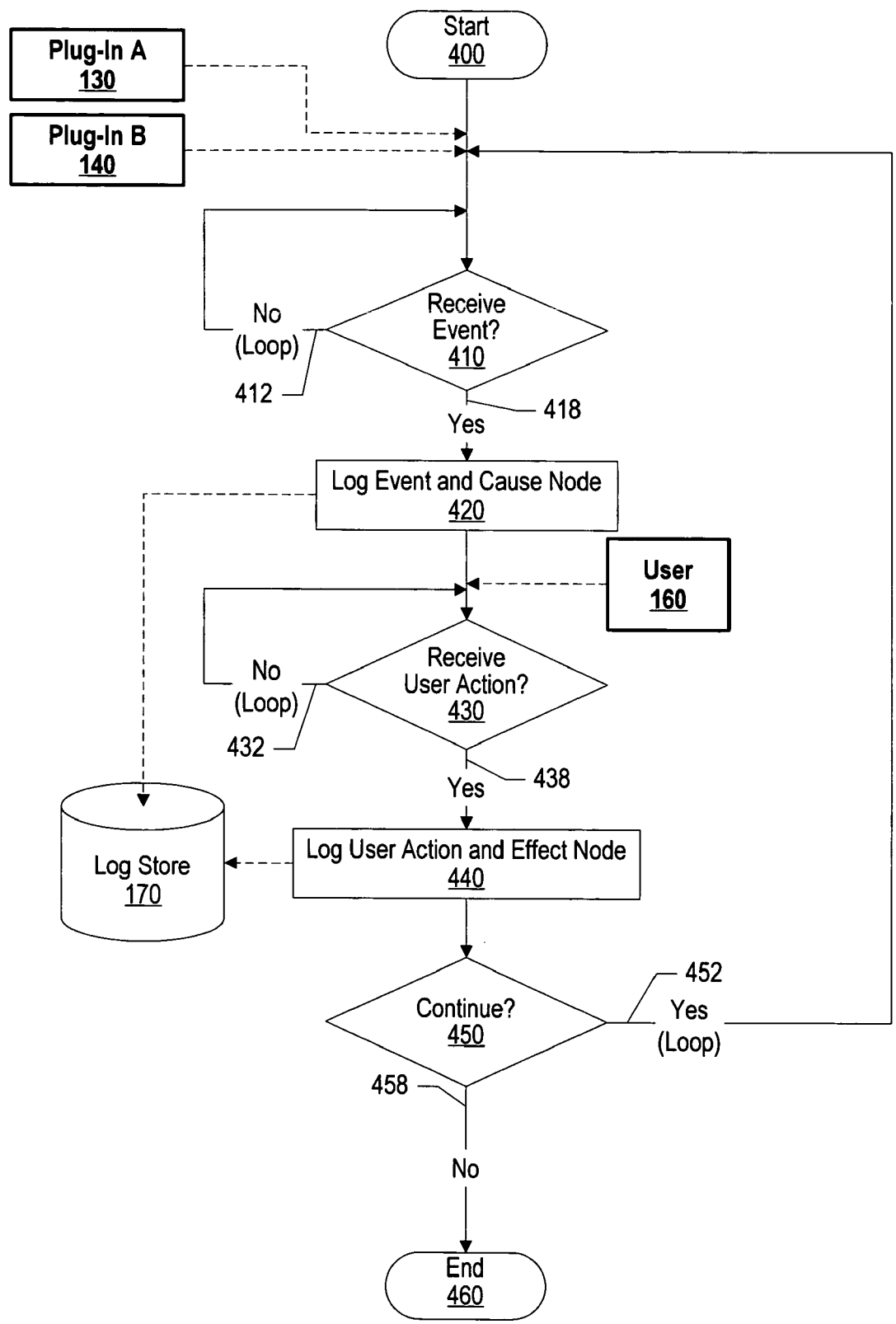
FIG. 4 is a high-level flowchart showing steps taken in collecting backend events and user actions.

FIG. 4 is a high-level flowchart showing steps taken in collecting backend events and user actions. Console processing commences at 400, whereupon a determination is made as to whether the console received a backend event from plug-in A 130 or plug-in B 140 (decision 410). The plug-ins send events to the console in response to receiving the events from their respective backends. For example, a backend may be an application server whereby the application database reports an error message and sends the error message to its plug-in (see FIG. 1 and corresponding text for further details regarding event reporting). Plug-in A 130 and plug-in B 140 are the same as that shown in FIG. 1.

If the console does not receive a backend event, decision 410 branches to "No" branch 412 which loops back to wait for a backend event from one of the plug-ins. This looping continues until the console receives a backend event from one of the plug-ins, at which point decision 410 branches to "Yes" branch 418 whereupon the console logs the backend event along with its corresponding cause node in log store 170 (step 420). A cause node is a node in a view whose corresponding object is the place at which the backend event occurs (see FIGS. 5, 6B, and corresponding text for further details regarding cause nodes). Log store 170 is the same as that shown in FIG. 1 and may be stored on a nonvolatile storage area, such as a computer hard drive.

A determination is made as to whether the console receives a user action from user 160 that corresponds to the backend event (decision 430). For example, user 160 may send a command to a backend to restart an application server in response to an error message. User 160 is the same as that shown in FIG. 1. If the console does not receive a user action from user 160, decision 430 branches to "No" branch 432 whereupon processing loops back to wait for a user action from user 160. This looping continues until the console receives a user action from user 160, at which point decision 430 branches to "Yes" branch 438 whereupon processing logs the user action along with its corresponding effect node in log store 170 at step 440. An effect node is a node in a view whose corresponding object is the place at which the user action occurs. In one embodiment, the console continues to log events it receives from plug-in A 130 and plug-in B 140 while it waits for user actions.

A determination is made as to whether to continue to log backend events and user actions (decision 450). If the console should continue to log backend events and user actions, decision 450 branches to "Yes" branch 452 whereupon processing loops back to log more backend events and user actions. This looping continues until the console should stop logging backend events and user actions, at which point decision 450 branches to "No" branch 458 whereupon processing ends at 460.

Figure 5:
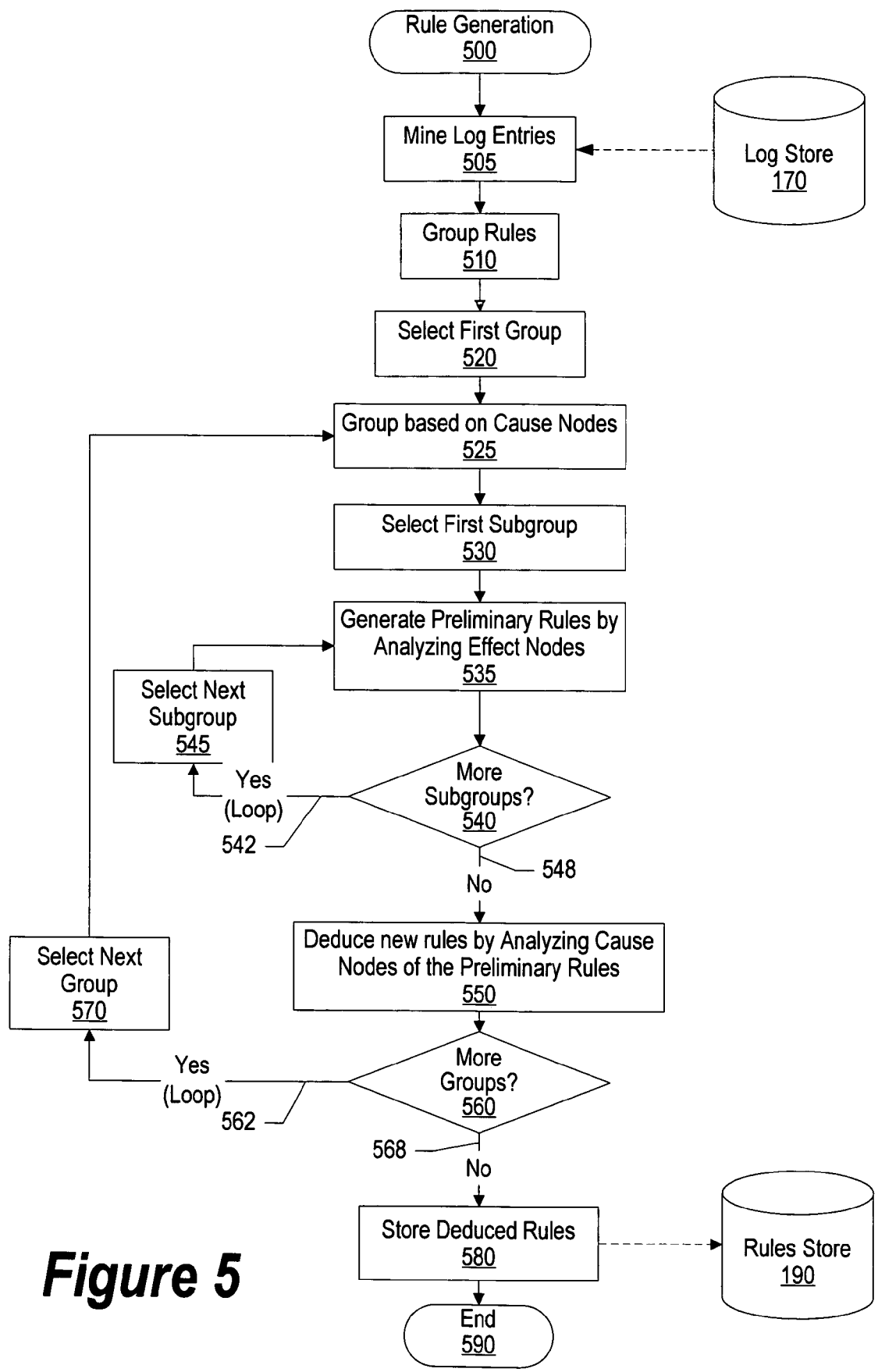
FIG. 5 is a detail level flowchart showing steps taken in generating new rules based upon log entries that correspond to backend events and user actions.

FIG. 5 is a detail level flowchart showing steps taken in generating new rules based upon log entries that correspond to backend events and user actions. A console previously received and stored backend events and user actions in log store 170 (see FIG. 4 and corresponding text for further details regarding logging backend events and user actions). Log store 170 is the same as that shown in FIG. 1 and may be stored on a nonvolatile storage area, such as a computer hard drive.

Rule generation processing commences at 500, whereupon the console mines the stored log entries at step 505. The mining process includes identifying a backend event, a user action, and their respective cause and effect nodes that correspond to each log entry. Processing groups "initial rules" at step 510 based upon backend event types and user action types. For example, one initial rule may be "E1(a11)→A1(c11)" where E1 is a particular event type (e.g. "server down") and A1 is a particular user action type. In this example, a11 is a cause node and c11 is an effect node. A cause node is a node in a view whose corresponding object is where the backend event occurs. Likewise, an effect node is a node in a view whose corresponding object is where the user action occurs (see FIG. 6B and corresponding text for further details regarding grouping).

After the initial rules are grouped, processing selects the first group at step 520. At step 525, processing subgroups the first group's initial rules based upon their respective cause nodes. Using the example described above, a11 is E1's cause node. Processing selects the first subgroup at step 530, and generates preliminary rules by analyzing the initial rules' effect nodes (step 535). Using the example described above, c11 is A1's effect node (see FIG. 6B and corresponding text for further details regarding preliminary rule generation).

A determination is made as to whether there are more subgroups included in the first group to analyze (decision 540). If there are more subgroups to analyze, decision 540 branches to "Yes" branch 542 whereupon processing loops back to select (step 545) and process the next subgroup. This looping continues until there are no more subgroups to analyze, at which point decision 540 branches to "No" branch 548 whereupon processing deduces new rules (e.g. "deduced rules") by analyzing the cause nodes of the preliminary rules that were generated in step 535 (step 550). In step 550 as well as step 535, group nodes are analyzed to deduct intermediate or global rules. Nodes may be of the form:

Nodes=((classname, constraint), (rolename, constraint)*)*

In addition, instances may be uniquely identified by a combination of a name of their respective class and key.

Starting from leaf nodes and traversing up until a level of the lowest common ancestor of both the cause and effect nodes, constraints are identified which generalize the nodes and represent the nodes in terms of the nodes at that level. Finally, each of the nodes are represented in terms of their lowest common ancestor mentioned earlier. The constraint identification may be performed using existing data mining algorithms.

A determination is made as to whether there are more groups from which to deduce rules (decision 560). If there are more groups to deduce rules, decision 560 branches to "Yes" branch 562 whereupon processing loops back to select (step 570) and process the next group. This looping continues until there are no more groups to process, at which point decision 560 branches to "No" branch 568 whereupon processing stores the deduced rules in rules store 190 at step 580. Rules store 190 is the same as that shown in FIG. 1 and may be stored on a nonvolatile storage area, such as a computer hard drive. Processing ends at 590.

Figure 6A:
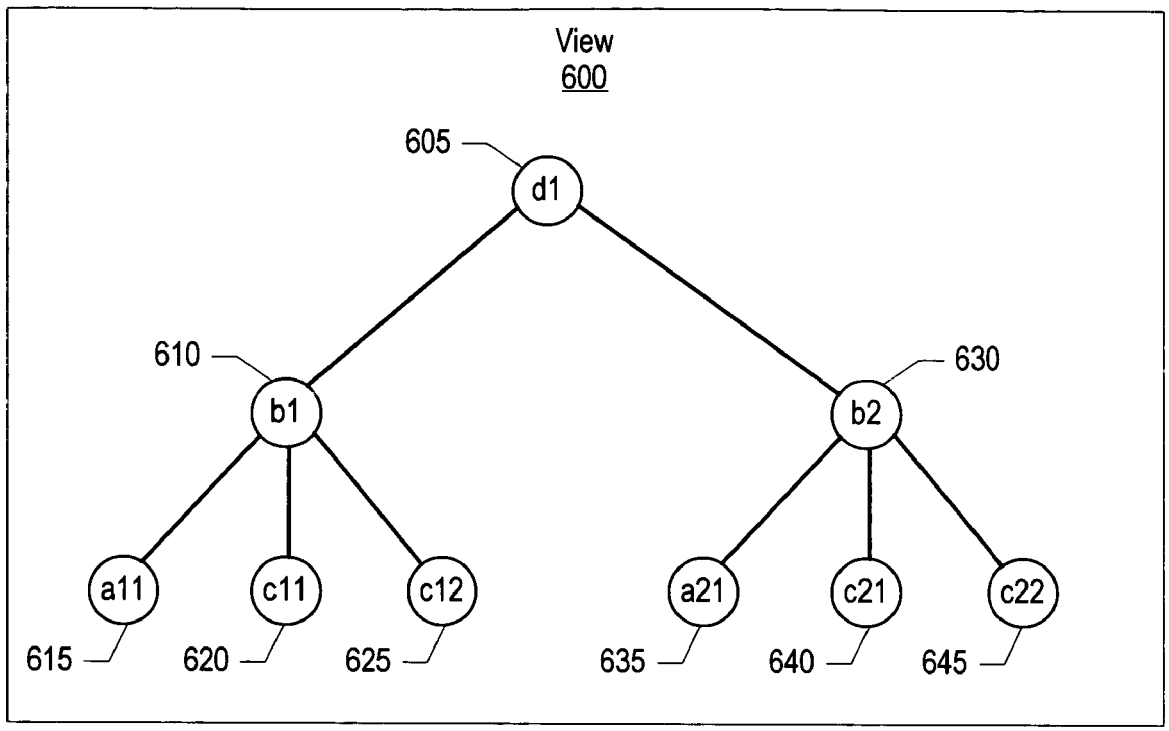
FIG. 6A is a user interface window showing a particular view of a perspective.

FIG. 6A is a user interface window showing a particular view of a perspective, such as that shown in FIG. 3. View 600 is generated using a perspective and a managed definition object (MDO) (see FIG. 1 and corresponding text for further details regarding view generation). View 600 includes nodes 605 through 645, each of which correspond to particular objects and classes. Node 605 is a root node of class type "D" and corresponds to a particular object, such as an enterprise. Nodes 610 and 630 are of class type "B" and correspond to objects that are associated with node 605, such as machines. Nodes 615 and 635 are of class type "A" and correspond to objects that are associated with nodes 610 and 630, such as application servers. Nodes 620, 625, 640, and 645 are of class type "C" and correspond to objects that are associated with nodes 610 and 630, such as web servers. A console uses view 600's corresponding perspective in order to deduce rules that encompass logged backend events and logged user actions (see FIG. 6B and corresponding text for further details regarding rule generation).

Figure 6B:
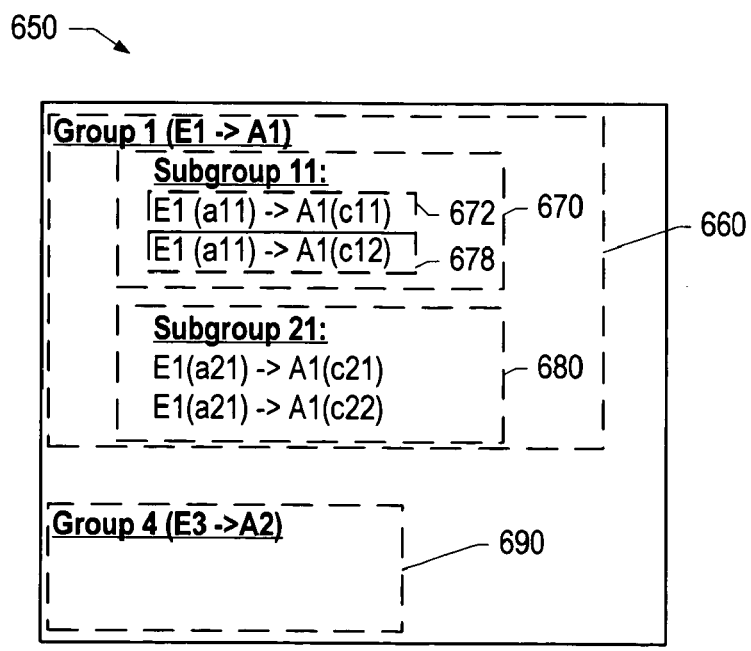
FIG. 6B is a user interface window showing an example of grouping and sub-grouping rules.

FIG. 6B is a user interface window showing an example of rule grouping and subgrouping. A console groups rules by mining log entries that correspond to a particular view, such as the one shown in FIG. 6A, and creates "initial rules" based upon the mining process. The initial rules are grouped by backend event type and user action type. Lines 660 show that a first grouping has initial rules that have a structure "E1→A1" where E1 is a particular backend event type and A1 is a particular user action type. For example, E1 may be "server down" and A1 may be "restart application." Line 690 show that a forth grouping has initial rules that have a structure "E3→A2." Again, E3 corresponds to a particular backend event type an A2 corresponds to a particular user action type.

Once the initial rules are grouped, each group is subgrouped based upon the initial rules' backend event type's corresponding cause nodes. A cause node is a node in a view whose corresponding object is where the backend event occurs. Using the example described above, the backend event "server down" may occur on server "XYZ" and the node in a view that corresponds to server XYZ is the cause node.

Lines 670 and 680 show subgroups of the first group. As can be seen in lines 670, the first subgroup has "a11" as a cause node. The node a11 corresponds to node 615 that is shown in FIG. 6A. Lines 680 include rules that are subgrouped that have "a21 as a cause node. The node a21 corresponds to node 635 that is shown in FIG. 6A.

Once the console subgroups the groups by cause node, the console generates "preliminary rules" for each subgroup by analyzing the commonality between the effect nodes in each subgroup. An effect node is a node in a view whose corresponding object is where the user action occurs. Using the example described above, the user action "restart application" may be targeted towards application "CDE" and the node in a view that corresponds to application CDE is the effect node.

Using FIG. 6A as a view while analyzing line 672, the console determines that in order to move from the cause node "a11" to the effect node "c11", it moves from a11 to b1 to c11. Analyzing line 678, the console determines that in order to move from the cause node "a11" to the effect node "c12", it moves from a11 to b1 to c12. The node a11 corresponds to a class type A, the node b1 corresponds to a class type B, and the nodes c11 and c12 correspond to a class type C. Therefore, the console is able to create a preliminary rule corresponding to lines 670 such that:

$$E_1(((B, \text{key}_{b1})\ r_{BA}, \phi)) \rightarrow A_1(((B, \text{key}_{b1})\ r_{BC}, \phi)$$

The console uses the same process to create a preliminary rule for the second subgroup (lines 680). This time, the console moves through node b2 instead of node b1 to move from the cause node to the effect node. Therefore, the console generates a preliminary rule corresponding to lines 680 such that:

$$E_1(((B, \text{key}_{b2})\ r_{BA}, \phi)) \rightarrow A_1(((B, \text{key}_{b2})\ r_{BC}, \phi)$$

After the console creates preliminary rules for each subgroup within a group, the console analyzes the preliminary rules along with their corresponding cause nodes. Using the above two formulas, the console is able to deduce a rule corresponding to the first group such that:

$$\forall_b \text{ in } ((D, \text{key}_{d1}), r_{DB}, \phi)$$

$$\text{if } E_1((b, r_{BA}, \phi)) \rightarrow A_1((b, r_{BC}, \phi)$$

The console stores the deduced rule in a storage area. Each deduced rule includes a "global backend event" and a "global user action" in which the console uses when it receives subsequent backend requests. For example, if the deduced rule is "for every server down event, restart application," then when the console receives subsequent "server down" events, the console performs a "restart application" action.

Figure 7:
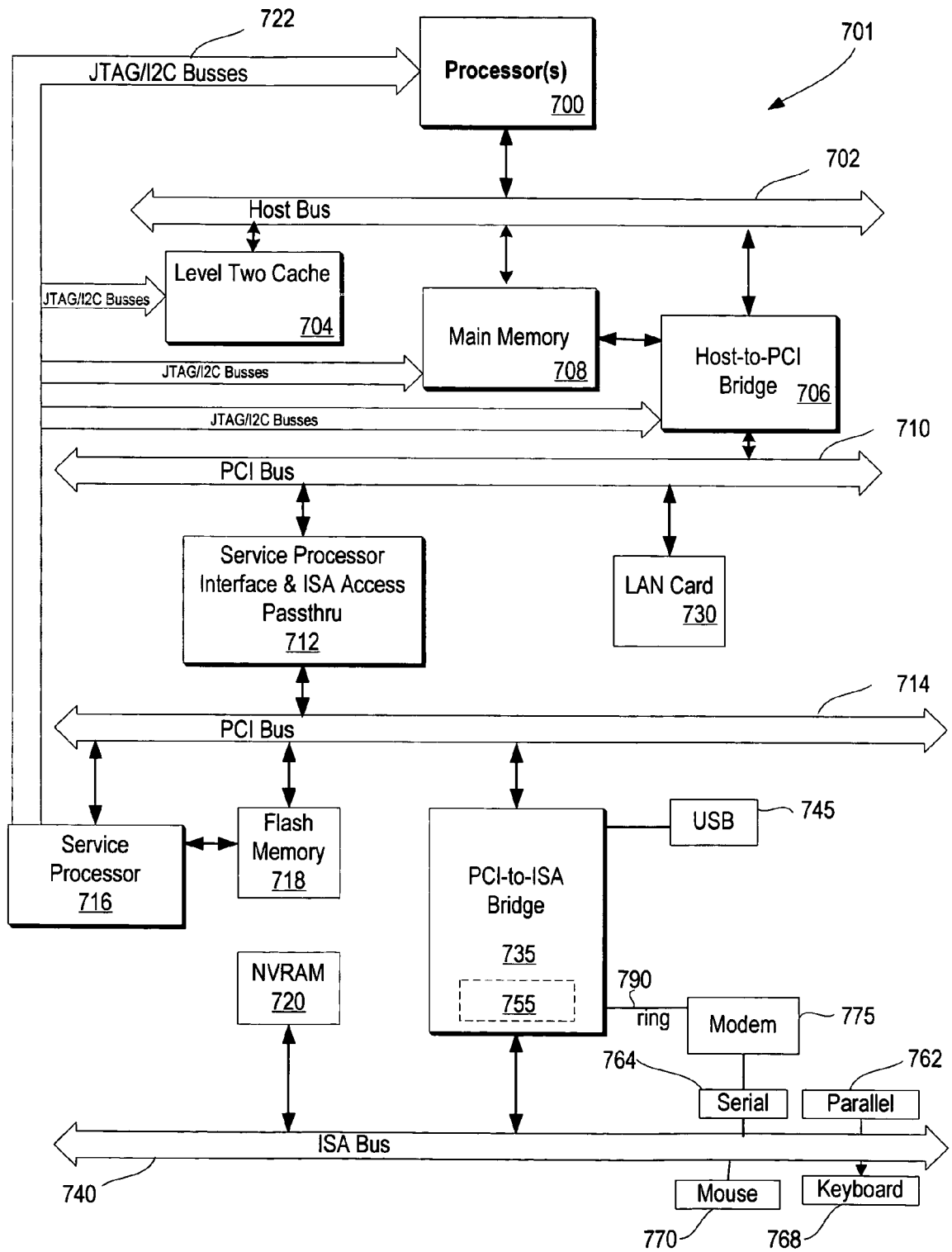
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    retrieving a plurality of log entries, wherein each of the plurality of log entries corresponds to a backend event or a user action;
    evaluating the plurality of log entries, the evaluating including:
        mining the log entries, the mining resulting in a plurality of initial rules, wherein each of the plurality of initial rules includes a backend event type and a cause node corresponding to one or more of the backend events, and also includes a user action type and an effect node corresponding to one or more of the user actions;
        grouping the plurality of initial rules based upon the backend event types and the user action types, the grouping resulting in one or more groups;
        subgrouping a first group based upon the cause nodes included in the first group, the subgrouping resulting in one or more subgroups; and
        generating preliminary rules using the initial rules included in a first subgroup based upon the effect nodes included in the first subgroup;
    in response to evaluating the plurality of log entries, generating one or more deduced rules using one or more of the preliminary rules based upon the cause nodes included in the preliminary rules, wherein each deduced rule includes a global event and a global action; and
    storing the deduced rules.

2. The method of claim 1 wherein a plurality of backend events are sent from a plurality of heterogeneous plug-ins, the heterogeneous plug-ins corresponding to a plurality of heterogeneous backends.

3. The method of claim 1 wherein one or more of the user actions corresponds to one or more of the backend events.

4. The method of claim 1 further comprising:
    receiving a subsequent backend event, the subsequent backend event corresponding to the global event; and
    performing the global action using one of the deduced rules.

5. The method of claim 1 wherein the rules are generated relative to a topology imposed by a view.

6. A program product comprising:
    computer operable medium having computer program code for execution by a computer, which, when executed by the computer, cause the computer program code to be effective to:
        retrieve a plurality of log entries, wherein each of the plurality of log entries corresponds to a backend event or a user action;
        evaluate the plurality of log entries, which include:
            mine the log entries, the miming resulting in a plurality of initial rules, wherein each of the plurality of initial rules includes a backend event type and a cause node corresponding to one or more of the backend events, and also includes a user action type and an effect node corresponding to one or more of the user actions;

group the plurality of initial rules based upon the backend event types and the user action types, the grouping resulting in one or more groups;

subgroup a first group based upon the cause nodes included in the first group, the subgrouping resulting in one or more subgroups; and generate preliminary rules using the initial rules included in a first subgroup based upon the effect nodes included in the first subgroup;

in response to evaluating the plurality of log entries, generate one or more deduced rules using one or more of the preliminary rules based upon the cause nodes included in the preliminary rules, wherein each deduced rule includes a global event and a global action; and store the deduced rules.

7. The program product of claim 6 wherein a plurality of backend events are sent from a plurality of heterogeneous plug-ins, the heterogeneous plug-ins corresponding to a plurality of heterogeneous backends.

8. The program product of claim 6 wherein one or more of the user actions corresponds to one or more of the backend events.

9. The program product of claim 6 wherein the computer program code is further effective to:

receive a subsequent backend event, the subsequent backend event corresponding to the global event; and perform the global action using one of the deduced rules.

10. The program product of claim 6 wherein the rules are generated relative to a topology imposed by a view.

11. An information handling system comprising:

one or more processors;

a memory accessible by the processors;

one or more nonvolatile storage devices accessible by the processors; and an object management tool for sending actions to introspectable objects, the object management tool comprising software code effective to:

retrieve a plurality of log entries from one of the nonvolatile storage devices, wherein each of the plurality of log entries corresponds to a backend event or a user action;

evaluate the plurality of log entries, which include:

mine the log entries, the mining resulting in a plurality of initial rules, wherein each of the plurality of initial rules includes a backend event type and a cause node corresponding to one or more of the backend events, and also includes a user action type and an effect node corresponding to one or more of the user actions;

group the plurality of initial rules based upon the backend event types and the user action types, the grouping resulting in one or more groups;

subgroup a first group based upon the cause nodes included in the first group, the subgrouping resulting in one or more subgroups; and generate preliminary rules using the initial rules included in a first subgroup based upon the effect nodes included in the first subgroup;

in response to evaluating the plurality of log entries, generate one or more deduced rules using one or more of the preliminary rules based upon the cause nodes included in the preliminary rules, wherein each deduced rule includes a global event and a global action; and store the deduced rules in one of the nonvolatile storage devices.

12. The information handling system of claim 11 wherein a plurality of backend events are sent from a plurality of heterogeneous plug-ins over a computer network, the heterogeneous plug-ins corresponding to a plurality of heterogeneous backends.

13. The information handling system of claim 11 wherein one or more of the user actions corresponds to one or more of the backend events.

14. The information handling system of claim 11 wherein the software code is further effective to:

receive a subsequent backend event over a computer network, the subsequent backend event corresponding to the global event; and perform the global action using one of the deduced rules.

15. The information handling system of claim 11 wherein the rules are generated relative to a topology imposed by a view.

16. A computer-implemented method comprising:

receiving a plurality of backend events from a plurality of heterogeneous plug-ins, the heterogeneous plug-ins corresponding to a plurality of heterogeneous backends;

detecting one or more user actions that correspond to the plurality of backend events;

retrieving a plurality of log entries, wherein each of the plurality of log entries corresponds to the plurality of backend events or one or more of the user actions;

evaluating the plurality of log entries, the evaluating including:

mining the log entries, the mining resulting in a plurality of initial rules, wherein each of the plurality of initial rules includes a backend event type and a cause node corresponding to one or more of the backend events, and also includes a user action type and an effect node corresponding to one or more of the user actions;

grouping the plurality of initial rules based upon the backend event types and the user action types, the grouping resulting in one or more groups;

subgrouping a first group based upon the cause nodes included in the first group, the subgrouping resulting in one or more subgroups; and generating preliminary rules using the initial rules included in a first subgroup based upon the effect nodes included in the first subgroup;

in response to evaluating the plurality of log entries, generating one or more deduced rules using one or more of the preliminary rules based upon the cause nodes included in the preliminary rules, wherein each deduced rule includes a global event and a global action; and storing the deduced rules.

17. A program product comprising:

computer operable medium having computer program code for execution by a computer, which, when executed by the computer, cause the computer program code to be effective to:

receive a plurality of backend events from a plurality of heterogeneous plug-ins, the heterogeneous plug-ins corresponding to a plurality of heterogeneous backends;

detect one or more user actions that correspond to the plurality of backend events;

retrieve a plurality of log entries, wherein each of the plurality of log entries corresponds to the plurality of backend events or one or more of the user actions;

evaluate the plurality of log entries, which include:
  mine the log entries, the mining resulting in a plurality of initial rules, wherein each of the plurality of initial rules includes a backend event type and a cause node corresponding to one or more of the backend events, and also includes a user action type and an effect node corresponding to one or more of the user actions;
  group the plurality of initial rules based upon the backend event types and the user action types, the grouping resulting in one or more groups;
  subgroup a first group based upon the cause nodes included in the first group, the subgrouping resulting in one or more subgroups; and
  generate preliminary rules using the initial rules included a first subgroup based upon the effect nodes included in the first subgroup subgroups;

in response to evaluating the plurality of log entries, generate one or more deduced rules using one or more of the preliminary rules based upon the cause nodes included in the preliminary rules, wherein each deduced rule includes a global event and a global action; and store the deduced rules.

* * * * *